Jan. 2, 1923.
A. KATZINGER,
BAKING PAN.
FILED APR. 2, 1921.
1,440,542.
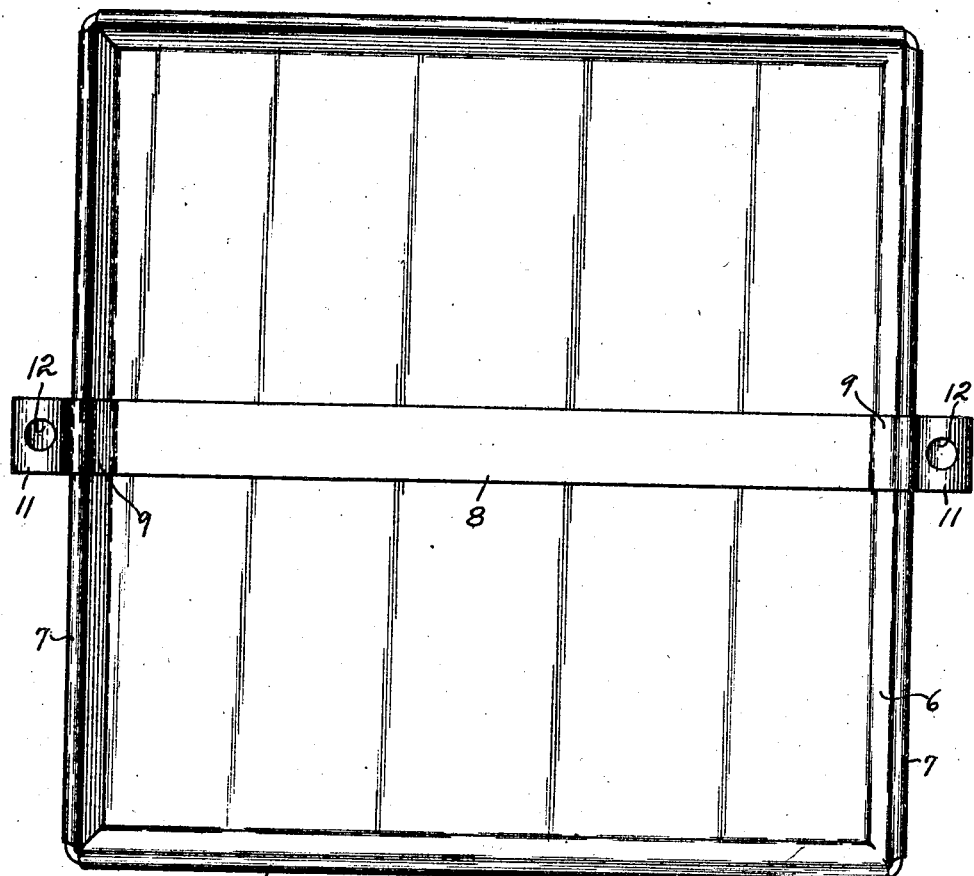
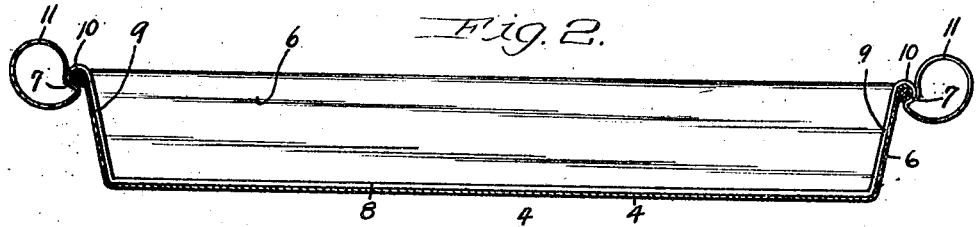

Patented Jan. 2, 1923.

1,440,542

UNITED STATES PATENT OFFICE.

ARTHUR KATZINGER, OF CHICAGO, ILLINOIS, ASSIGNOR TO EDWARD KATZINGER COMPANY, OF CHICAGO, ILLINOIS, A CORPORATION OF ILLINOIS.

BAKING PAN.

Application filed April 2, 1921. Serial No. 457,893.

*To all whom it may concern:*

Be it known that I, ARTHUR KATZINGER, a citizen of the United States, residing at Chicago, in the county of Cook and State of Illinois, have invented certain new and useful Improvements in Baking Pans, of which the following is a specification.

My invention relates to baking pans and has for one of its objects the provision of a baking pan having simple and efficient means for loosening articles baked in said pan.

A further object is the provision of a baking pan having a member for loosening articles baked in the pan, the latter being adapted for quick and easy removal from the pan.

A further object is the provision of a baking pan having a movable member attached thereto which extends above the top of the pan and is adapted to support the latter in inverted position.

A still further object is the provision of a baking pan having an adjustable member mounted thereon with an opening in said member adapted to engage a nail or other object for supporting the pan when not in use.

Other objects will appear hereinafter.

An embodiment of my invention is illustrated in the accompanying drawing, forming a part of this specification, and in which—

Fig. 1 is a plan view of a baking pan embodying my invention;

Fig. 2 is a section of the same; and

Fig. 3 is a fragmental side elevation showing the pan in inverted position.

Referring more particularly to the drawing, I have indicated a rectangular pan having a plane bottom 4 with upright walls 6 at the edges of the bottom and a wired rim 7 extending around the top of the side walls. The pan with its side walls and rim may be of any approved or ordinary design.

Disposed on the bottom 4 I have indicated a flat ribbon-like knife 8 which is adapted to be moved laterally thereof from one side of the pan to the opposite side for cutting loose a cake or other article baked in the pan after such baking. The knife 8 has portions 9 extending across two of the side walls 6 so as to cut the cake or other article loose from the side walls at the same time such cake or other article is loosened from the bottom.

As a simple means for holding the knife 8 in position I have indicated portions 10 which extend partially around the wired rims 7 so as to hold the knife 8 in position and permit its free movement bodily and laterally across the pan bottom.

At the ends of the curved portions 10 I have indicated loops 11, and these loops 11 are preferably extended above the top of rims 7 so that when the pan is inverted, as indicated in Fig. 3, the loops 11 may support the pan. This construction will have the advantage of holding a pan up from a supporting surface while an article which has been baked therein is permitted to free itself from the pan. The loops, furthermore, are of sufficient size to permit easy handling of the pan when so desired.

In loops 11 I have provided openings 12, either one of which may engage a nail in a wall or other place, not shown, for supporting the pan when not in use.

The knife which comprises parts 8, 9, 10 and 11 is preferably of a resilient material so that it will remain in close contact with the bottom 4 and walls 6, and so that the curved portions 10 may spring off the wired rims 7 when it is desired to remove the knife from the pan. It will also be apparent that the knife can be quickly and easily put back in position and sprung into place due to the resiliency of the material thereof.

It will be seen that the knife 8, 9 comprises a single metal strip having extensions which are tubular transversely and circular in elevation, as shown in Fig. 2, so as to spring around and under the lower shoulders of the wired rims 7 to firmly hold the knife 8, 9 against the bottom of the pan and against the side walls. It will be noted that the tubular extensions 10, 10 extend more than half way around the wired rims 7, so that the pan may be safely lifted with the contents therein by means of the handles 11, 11. While the knife is thus held closely fitting the bottom and spaced-apart side walls of the pan the tubular spring clips 10, 10 also act to guide the knife around the bottom and side walls of the pan without any effort on the part of the operator to hold the knife in proper position during operation. Connected to the spring clips are additional extensions of the metal strip curved into closed loops, as shown in Fig. 2, to serve as handles for operating the knife and for also detaching the knife from the pan when desired. It will also be seen that by forming the single strip of metal as shown in Fig. 2, various functions may be performed and various advantages obtained, and furthermore, by forming these handles so as to project above the upper plane extending from the upper edges of the pan these handles serve as foot rests when the pan is inverted so as to elevate a portion of the pan while it is resting on a plane surface such as a baking table. When the pan is not in use it may be hung up by placing the opening 12 over a suitable peg or nail so as to suspend the pan with its open side toward a vertical wall. The handles 11 being on opposite sides of the pan will provide two points of support for the latter when it is inverted, as illustrated in Fig. 3. These handles and one edge of the pan will support the latter in an inclined position when the pan is inverted and placed on a supporting surface to allow the baked material to cool, shrink and drop to wholly released position.

Obviously those skilled in the art may make various changes in the details and arrangements of parts without departing from the spirit and scope of my invention as defined by the claims hereto appended and I wish therefore not to be restricted to the precise construction herein disclosed.

I claim:—

1. A knife adapted to fit the bottom and spaced-apart inner sides of a baking pan, resilient means at the ends of the knife to fit the edges of the pan to hold the knife in position and to guide the same, and handles projecting above the plane of the upper edges of the pan at the ends of the knife to serve as foot rests to hold a portion of the pan elevated when such pan is inverted and placed on a supporting surface to allow the baked material to cool, shrink and drop to wholly released position.

2. A knife adapted to fit closely against the bottom and inner spaced-apart side walls of a baking pan and slide therealong, and handles connected to the ends of said knife in position to operate the latter and to hold a portion of the pan elevated when inverted and resting on a supporting surface to permit the baked material to become detached from the pan.

3. The combination with a baking pan having a beaded rim with an outer shoulder on its under side, of a detachable knife adapted to closely fit the bottom of said pan and comprising a spring clip extension formed around and under said shoulder to hold the knife in position and guide the same along the bottom of said pan, and a handle for operating said knife and for also operating said spring clip to detach said knife from said pan.

4. The combination with a baking pan having a beaded rim with an outer shoulder on its under side, of a detachable knife adapted to closely fit the bottom of said pan and comprising resilient means extending more than half way around said beaded rim to grip said rim by extending to the under side of said shoulder to hold the knife in operating position and to guide the same, and handle extending from said resilient means serving to operate the latter to connect or disconnect said knife to or from said pan, said extension being formed to also serve as a foot rest to hold a portion of the pan elevated when inverted and resting on a plane surface.

5. A bake pan knife comprising a single strip of metal adapted to scrape along the bottom of a pan to loosen baked material therefrom, resilient extensions at the ends of said metal strip tubular in formation and circular in cross-section adapting them to fit more than half way around and under the wired rim of a bake pan to hold the knife against the bottom of the pan and guide it along such bottom, and extensions from said resilient holders curved to positions above the plane of the upper edges of the pan to serve as handles to lift the pan with its contents therein and to operate the knife and to elevate a portion of the pan when in inverted positions on a baking table.

6. A bake pan knife comprising a single flat strip of integral metal adapted to slide along the bottom and spaced apart inner walls of a bake pan, resilient extensions tubular transversely and circular in cross-section and adapted to be sprung more than half way around the spaced apart wired rim of a bake pan to the under sides of said rim to hold the knife in operating positions and to guide the same, and handles formed by continued extensions from said resilient tubular holders curved into closed loops extending above the planes of the upper edges of the pan to hold a portion of the pan in elevated position when inverted and resting on a baking table, said loop being provided with perforations to enable the pan to be hung up from either end or to enable the pan to be hung up with its vertical side facing the wall.

7. A knife adapted to fit the bottom and spaced apart inner sides of a baking pan having a wired rim, resilient extensions at the ends of the knife extending more than half way around the wired rim to grip the under sides of the rim to hold the knife closely fitting the bottom and circular sides of the pan and to guide such knife during operation, and upwardly projecting handles at the ends of the knife serving as foot rests to hold a portion of the pan elevated when inverted and placed on a supporting surface to allow the baked material to cool, shrink and drop to released position, said handles also serving to lift the pan with the contents therein and to detach said resilient extensions from the rim of the pan to remove the knife from the pan.

8. The combination with a baking pan having a fluted rim with an outer shoulder on its under side, of a detachable knife adapted to closely fit the bottom of said pan and comprising a spring clip extension sprung around and under said shoulder to hold the knife in position and guide the same along the bottom of said pan, and a handle for operating said spring clip, said handle being constructed also to hang the pan on a vertical wall with the open side thereof facing the wall.

9. In combination, a knife adapted to slide along the bottom of a baking pan, means at the ends of the knife for connection to the rim of such baking pan to guide the knife along the bottom of the pan and to have a close fit with such bottom, and handles attached to said connection means for operating said knife, said handles being extended above the plane of the upper edges of the pan to serve as foot rests to hold a portion of the pan elevated when inverted and resting on a plane supporting surface.

10. The combination with a baking pan, of a knife slidably mounted in said pan to closely fit its bottom, means at the ends of said knife for connection to the rim of said pan, and loop extensions from said connection means to positions above the plane of the upper edges of the pan, there being a perforation in one of said loops adapted to engage a support for sustaining the pan when not in use.

11. In combination, a baking pan having a wired rim, an integral strip of resilient material having a portion disposed across the bottom of the pan to make a close fit therewith, portions disposed against opposite side walls of the pan to make close fit with such side walls, portions extending partially around said wired rim, and portions disposed in loops to serve as handles for operating the portions along the bottom and side walls while said portions which extend along the wired rim guide said first named portions along the inside of the pan, there being an opening in one of the loops for suspending the pan when not in use.

In testimony whereof I have signed my name to this specification on this 31st day of March, A. D. 1921.

ARTHUR KATZINGER.